United States Patent [19]

Hähnel

[11] 4,449,361

[45] May 22, 1984

[54] RAM JET ENGINE CONSTRUCTION AND A VALVE CONTROL FOR PROPORTIONING FUEL RICH GAS OF RAM JET ROCKET ENGINES

[75] Inventor: Thomas Hähnel, Ottobrunn, Fed. Rep. of Germany

[73] Assignee: Messerschmitt-Bölkow-Blohm GmbH, Fed. Rep. of Germany

[21] Appl. No.: 354,627

[22] Filed: Mar. 4, 1982

[30] Foreign Application Priority Data

Apr. 15, 1981 [DE] Fed. Rep. of Germany ....... 3115187

[51] Int. Cl.$^3$ .......................... F02K 9/00; F02K 7/08
[52] U.S. Cl. .................................... 60/254; 60/270.1; 251/308
[58] Field of Search .............. 60/245, 254, 251, 270.1, 60/917; 251/309, 308

[56] References Cited

U.S. PATENT DOCUMENTS

| | | | |
|---|---|---|---|
| 2,948,112 | 8/1960 | Smith | 60/270.1 |
| 3,064,940 | 11/1962 | Anderson et al. | 251/309 |
| 3,642,247 | 2/1972 | Scaramucci | 251/308 |
| 3,712,058 | 1/1973 | Cooper | 60/254 |
| 4,075,832 | 2/1978 | Diesinger et al. | 60/254 |
| 4,260,129 | 4/1981 | Groenefeld | 251/308 |

FOREIGN PATENT DOCUMENTS 3005864 9/1981 Fed. Rep. of Germany ........ 60/917

Primary Examiner—Louis J. Casaregola
Assistant Examiner—Timothy S. Thorpe
Attorney, Agent, or Firm—McGlew and Tuttle

[57] ABSTRACT

A ram jet engine comprises a wall structure defining a precombustion chamber having a solid fuel which when ignited can raise fuel rich gases which flow through a valve housing passage and into a main combustion chamber where final combustion takes place. A valve is provided in the valve housing which includes a shaft portion which is driven for example by an electric motor to rotate a valve body between two end positions in which the valve body is shifted from a position substantially blocking off all flow through the valve passage to one in which it permits a maximum preselected flow. The valve body is advantageously journalled on a shaft and is provided with a hub portion which embraces the shaft and protects it from the hot gases. The valve body is shaped as a cylindrical wedge tapering from the widest portion of one end to a narrowest portion at the opposite end. The valve body is oriented in the valve passage so that with its widest end facing the precombustion chamber it substantially blocks off the flow of the gas. When it is rotated so that its narrowest end faces toward the precombustion chamber a maximum amount of gas flow as desired is permitted to flow through the passage.

12 Claims, 7 Drawing Figures

RAM JET ENGINE CONSTRUCTION AND A VALVE CONTROL FOR PROPORTIONING FUEL RICH GAS OF RAM JET ROCKET ENGINES

FIELD AND BACKGROUND OF THE INVENTION

The invention relates in general to ram jet engines and in particular to a new and useful valve with a rotatable body for proportioning a quantity of flowing medium, in particular the quantity of the fuel rich gases flowing into the combustion chamber of ram jet rocket engines.

In machine construction valves installed in ducts for proportioning the flow quantities of flowing media are known in many forms. Generally, to keep the flow losses to a minimum, these movable machine elements should be designed for favorable flow characteristics. Further in order to reduce the forces due to inertia and to permit high operating frequencies, the structural weight of the valves should be as low as possible.

In certain operational situations special problems arise which can be mastered only by specific valve properties. Thus, in some thermal engines, as in ram jet rocket engines operating with fuel rich gases which are generated in a precombustion chamber from a solid chemical fuel and flow over one or more lines to a main combustion chamber, to which atmospheric oxygen is supplied for stoichiometric final combustion, solid particles occur in the hot gas stream. These particles have the objectionable property of being very adhesive. This causes fouling of lines, and in particular in the valves, at existing edges, corners, undercuts and in cavities, depositions form which may lead to failure to these important control elements.

SUMMARY OF THE INVENTION

The invention provides a valve with a rotatable valve body which not only moves easily, weighs little, is compact, and is cheap to manufacture, but also avoids undesirable depositions of particles present in the hot gas stream, so that full operability is ensured.

This problem is solved according to the invention in that viewed in its plane of rotation, the valve body is designed as a cylindrical wedge whose back completely closes the valve passage opening or clears the smallest control cross section thereof, and whose tapered end determines the largest controlled cross section of the valve passing opening.

The valve according to the invention moves easily, has little mass, requires little installation space, can be installed practically everywhere without any special expenditure for design, is cheap to manufacture, and has above all the special feature that due to its favorable flow characteristics it remains free from undesired residues even in hot gas streams with a high solid particle concentration, whereby its operational effectiveness is preserved.

As a development of the invention, the valve body is made of highly heat resistant material.

Further, the valve body according to the invention is fixed on a shaft mounted in the valve housing for rotation to both sides, the central shaft portion, on which the valve body is fitted, being shielded by hubs thereof on both sides. By the shielding of the central shaft portion, the latter is protected against extreme heat action, so that the valve shaft undergoes no deformation and the easy motion of the valve is not impaired.

Accordingly, it is an object of the invention to provide a ram jet engine which comprises wall means which define a precombustion chamber having a fuel which is ignitable therein to form a fuel rich gas or gases which flow through a valve housing into a main combustion chamber and wherein the valve housing includes a valve member in the flow passage which is rotatably mounted in the wall means and is of a cylindrical wedge shape which tapers from a widest part of one end to a narrowest part at its opposite end which substantially blocks flow from the precombustion chamber to the main combustion chamber when oriented in one position and permits a preselected flow when oriented in a second position.

A further object of the invention is to provide a valve particularly for controlling fluid flow between a precombustion chamber to a main combustion chamber of a ram jet engine which comprises a valve housing which has a flow passage therethrough with a valve member in the flow passage which has at least one valve shaft journal in the housing and has a portion extending across the passage and which includes a valve body affixed to the shaft for rotation therewith which has a hub portion embracing the shaft and a cylindrical wedge shape portion tapering from the widest part at one end to a narrowest part at the opposite end.

A further object of the invention is to provide a ram jet engine and a valve for controlling fluid flow in a ram jet engine which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
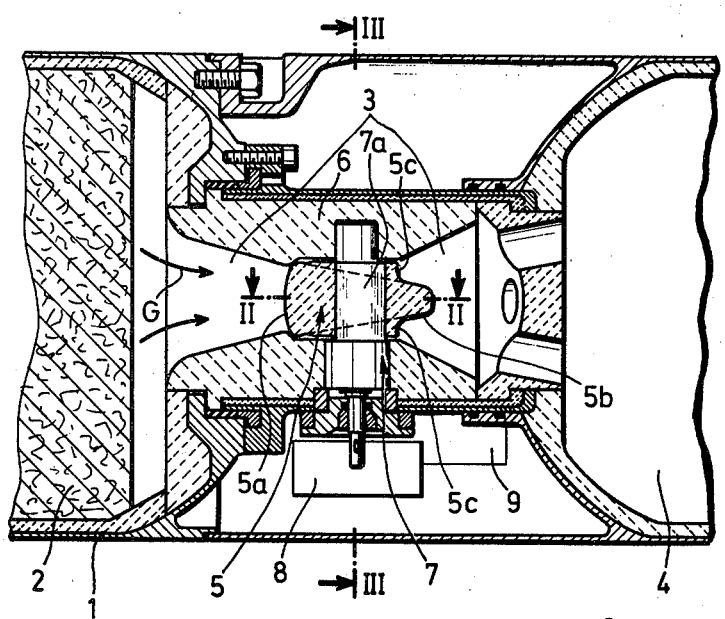
FIG. 1 is a longitudinal sectional view through a central region of a rocket ram jet engine having a valve constructed in accordance with the invention.

Referring to the drawings, in particular the invention embodied therein comprises a ram jet engine having a wall structure defining a precombustion chamber 1 having an ignitable fuel therein, for example a solid fuel 2 which is ignitable to form fuel rich gases which flow in a direction of the arrows G into a valve housing 6 which has a flow passage for gas duct 3 which interconnects the precombustion chamber 1 with a main combustion chamber 4. A valve member in the form of a rotatable valve body 5 is disposed in the flow passage 3 and is rotatably mounted in the walls on a shaft 7 which is journalled therein. The valve body 5 is of a cylindrical wedge shape. The valve body 5 tapers from a widest portion 5a at one end to a narrowest portion 5b at its opposite tapered end.

As can be seen from FIG. 1, in a precombustion chamber 1, by burning of a solid fuel 2 with oxygen deficit, fuel rich hot gases G are generated, which flow via a gas duct 3 into a main combustion chamber 4. There the fuel rich gases G are burned stoichiometrically with the aid of atmosphere oxygen additionally supplied.

In the gas duct 3, for proportioning the quantities of gas flowing over, a valve with a rotatable valve body 5 is installed which, viewed in its plane of rotation, is designed as a cylindrical wedge and is fixed on a shaft 7 mounted for rotation in the valve housing 6. The wide back of the wedge is designated by 5a, the narrow taper by 5b. The shaft 7 is driven in any desired manner, e.g. via a transmission 8 by an electric motor 9.

Figure 1A:
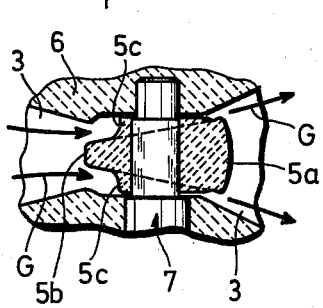
FIG. 1a is a detail of the valve body of the engine shown in FIG. 1 showing the valve body rotated by 180° from the position shown in FIG. 1 and providing for maximum control fluid flow cross section.
Figure 2:
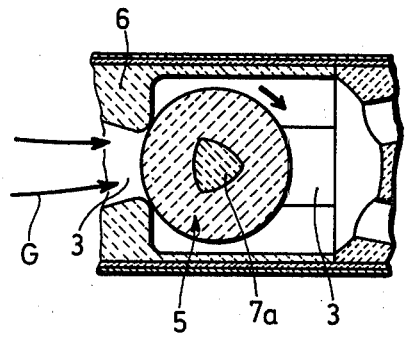
FIG. 2 is a section taken along the line II—II of FIG. 1.
Figure 3:
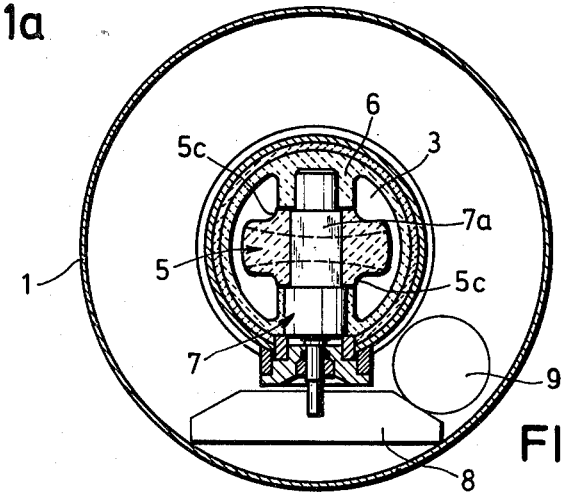
FIG. 3 is a section taken along the line III—III of FIG. 1.

In FIG. 1a, the valve body 5 is shown rotated by 180° in circumferential direction relative to FIG. 1, that is, a tapered end 5b now points in the direction of the precombustion chamber 1, whereby the largest valve cross section of the valve passage opening is determined. In FIG. 1, instead, the wide back 5a of the wedge completely shuts off the gas duct. However, it would be conceivable also to localize the valve body 5 relative to the valve cross section in such a way that also in the position according to FIG. 1 a small (minimal) passage cross section remains.

To protect the central shaft portion 7a against the thermal load of the hot gases G, the valve body 5 here has a central hub 5c which extends on all sides or at least on both sides.

Figure 4:
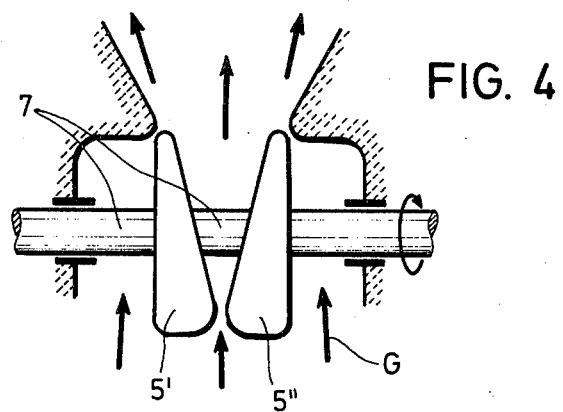
FIGS. 4 and 5 are schematic sectional views of another embodiment of the invention showing a valve body in the maximum and minimum flow orientation respectively.
Figure 5:
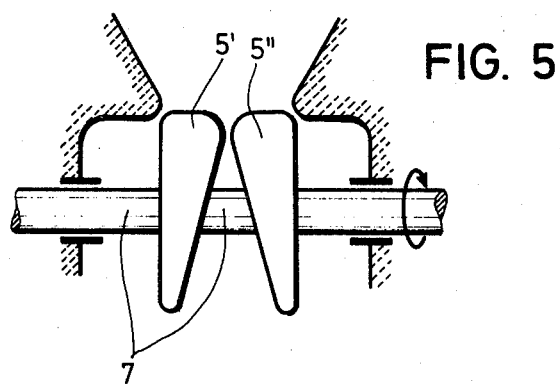

As can be seen from FIGS. 4 and 5, also two valve bodies 5' and 5" may be arranged on a shaft 7' side by side, the valve being shown in FIG. 4 in open position and in FIG. 5 in closing or respectively minimal position.

Figure 6:
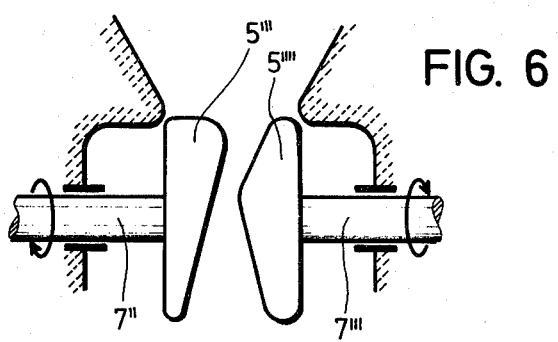
FIG. 6 is a view similar to FIGS. 4 and 5 of another embodiment of the invention.

Alternatively, each valve body 5''' and 5'''' may, as shown in FIG. 6, be provided on its own shaft 7" and 7''', each shaft being driven independently of the other shaft.

The valve body 5 is made of a high heat resistant material.

While specific embodiments of the invention have been shown and described in detail to illustrate the application of the principles of the invention, it will be understood that the invention may be embodied otherwise without departing such principles.

What is claimed is:

1. A valve particularly for controlling fluid flow between a precombustion chamber to a main combustion chamber of a ram jet engine, comprising a valve housing having a flow passage therethrough with a valve seat defining a throat area, a valve in said housing having at least one valve shaft portion journalled in said housing having a valve body portion extending across said passage, said valve body portion being fixed to said shaft portion for rotation therewith and being of a cylindrical wedge-shaped configuration tapering from a widest part adjacent one end to a narrowest part at a diametrically opposite end, said one end being of a size to completely close said throat area in a closed position and said diametrically opposite end being of a size to open at least a portion of said throat area in an open position.

2. A valve according to claim 1, wherein said valve body comprises a highly heat resistant material.

3. A valve according to claim 1, wherein said valve shaft is a separate member having its respective opposite ends rotatably mounted in said valve housing and a central shaft portion extending across said passage, said valve body being mounted on said central shaft portion and having a hub portion embracing said shaft portion and shielding it on all sides.

4. A valve according to claim 1, wherein said valve body comprises two body portions arranged side by side on said shaft portion and each being of cylindrical wedge shape and being rotatably affixed to said shaft portion.

5. A valve according to claim 1, wherein said valve body portion comprises two separate valve bodies, said shaft portion comprising two separate shafts each having one end journalled in said valve housing and an opposite end carrying a respective valve body portion.

6. A valve according to claim 5, including means for driving each of said shaft part independently.

7. A valve according to claim 1, including means connected to said shaft to rotate said shaft.

8. A ram jet engine, comprising wall means defining a precombustion chamber, a main combustion chamber and a valve housing having a flow passage interconnection with said precombustion chamber and said main combustion chamber with a valve seat defining a throat area, and a valve member in said flow passage rotatably mounted in said wall means and being of a cylindrical wedge-shaped tapering from a widest part adjacent one end to a narrowest part at its diametrically opposite end and substantially blocking flow from said precombustion chamber to said combustion chamber when oriented in one position and permitting a selected maximum flow when oriented in a diametrically opposite second position, said one end being of a size to completely close said throat area and said diametrically opposite end being of a size to open at least a portion of said throat area.

9. A ram jet engine according to claim 8, wherein said valve body comprises two separate valve body members fixed to said shaft at spaced locations thereon, each having their widest and narrowest portions oriented in corresponding positions on said shaft.

10. A ram jet engine according to claim 8, wherein said valve member includes a single shaft portion having respective opposite ends journalled in said housing and carrying said valve body between said respective opposite ends.

11. A ram jet engine according to claim 8, wherein said valve member includes first and second shaft members each having first ends journalled in said housing and opposite ends extending into said passage, said valve member including a valve body secured to each shaft.

12. A ram jet engine according to claim 11, wherein at least one of said valve bodies has a widest portion located intermediate its length.

* * * * *